UNITED STATES PATENT OFFICE.

JAKOB REUTER, OF FULLERTON, KANSAS.

METHOD OF HARDENING COPPER.

SPECIFICATION forming part of Letters Patent No. 587,861, dated August 10, 1897.

Application filed May 14, 1897. Serial No. 636,554. (No specimens.)

*To all whom it may concern:*

Be it known that I, JAKOB REUTER, of Fullerton, in the county of Hodgeman and State of Kansas, have invented certain new and useful Improvements in Methods of Hardening Copper; and I do hereby declare the following to be a full, clear, and exact description of the invention, such as will enable others skilled in the art to which it appertains to make and use the same.

This invention relates to a method for hardening copper; and it consists of the several steps which will be more fully hereinafter described and claimed.

In carrying out the method enough finely-powdered clay is mixed with clear vinegar to make a pulpy mass which is to be stiff enough so that it may be readily worked. The copper to be hardened is then covered with the moistened clay set forth, which is either in the form of a ball or other shape, and the said clay, with the copper therein, is placed within a furnace directly on the fire thereof and allowed to remain from five to six hours under intense heat. At the expiration of this time the clay carrying the copper is removed from the furnace and quickly submerged in cold water. The clay is then broken open and the copper removed and the same operation repeated successively until the copper has reached the desired degree of hardness. When the clay is broken open after being heated, the copper will be found to be surrounded by a thin crust which readily peels off, leaving an interior portion of the copper whiter than the said crust, the latter being red. The successive hardening operation set forth on each piece of copper will gradually lighten its color, and the crust which forms on the copper is apparently one of the several constituents of ordinary copper exuding and depositing on the outer surface.

By a qualitative and quantitative analysis of a given quantity of the clay used in the method the constituents and their proportions are found to be about as follows: Aluminium silicate, five parts; silicate, ten parts; iron sulfate, one part; sodium, trace; potash sulfite, trace; earthy residuum forming balance.

Having thus described the invention, what is claimed as new is—

The herein-described method of hardening copper consisting of inclosing a piece of copper within a covering of clay saturated with vinegar, subjecting the clay containing the copper to a high degree of heat, and finally submerging the heated clay carrying the copper in water, substantially as and for the purposes specified.

In testimony whereof I have signed this specification in the presence of two subscribing witnesses.

JAKOB REUTER.

Witnesses:
 JACOB RETTINGER,
 G. W. NOTESTINE.